US012583721B1

(12) United States Patent
Schorr

(10) Patent No.: US 12,583,721 B1
(45) Date of Patent: Mar. 24, 2026

(54) MOTORCYCLE LIFT ACCESSORY

(71) Applicant: Ron Schorr, North Richland Hills, TX (US)

(72) Inventor: Ron Schorr, North Richland Hills, TX (US)

( * ) Notice: Subject to any disclaimer, the term of this patent is extended or adjusted under 35 U.S.C. 154(b) by 468 days.

(21) Appl. No.: 18/118,728

(22) Filed: Mar. 7, 2023

(51) Int. Cl.
*B66F 11/00* (2006.01)

(52) U.S. Cl.
CPC .................................... *B66F 11/00* (2013.01)

(58) Field of Classification Search
CPC .. B66F 11/00; B66F 11/04; B60S 9/00; B60S 9/02; B60S 13/00
See application file for complete search history.

(56) References Cited

U.S. PATENT DOCUMENTS 1,403,690 A * 1/1922 Janeszewski ............. B66F 3/08 254/98
3,967,834 A * 7/1976 La Charite ............... B62J 50/10 280/304.5
4,494,764 A 1/1985 Kelley
7,066,448 B2 6/2006 Thurm
7,188,854 B1 3/2007 Pickens
7,270,211 B1 9/2007 Jones
8,398,056 B1 3/2013 Morrison
8,453,536 B1 * 6/2013 Quintero .................. B62J 99/00 74/543
9,233,634 B1 1/2016 Level
10,604,123 B2 3/2020 Huang
2004/0046356 A1 * 3/2004 Lewoczko ................ B66F 1/00 254/47
2012/0267587 A1 10/2012 Hunt
2013/0119636 A1 * 5/2013 Hon ......................... B62J 35/00 280/304.5
2022/0379984 A1 * 12/2022 VanValkenburgh ...... B66F 5/02

* cited by examiner

*Primary Examiner* — Jacob S. Scott
(74) *Attorney, Agent, or Firm* — Cramer Patent & Design, PLLC.; Aaron R. Cramer

(57) ABSTRACT

The motorcycle lift accessory is an accessory for a motorcycle. The motorcycle lift accessory may comprise a crash bar gripper and a lifting handle. The motorcycle lift accessory may detachably couple to a rear crash bar of the motorcycle that has been dropped. The motorcycle lift accessory may be adapted to be grasped by a motorcyclist while lifting the motorcycle. As a non-limiting example, the motorcyclist may couple the crash bar gripper to the rear crash bar under the motorcycle, may crouch next to the motorcycle while facing away from the motorcycle, may grasp the lower end of the handlebar with a firsthand and the lifting handle with a second hand, and may lift the motorcycle by standing. The motorcycle lift accessory may be removed from the rear crash bar of the upright motorcycle.

14 Claims, 4 Drawing Sheets

MOTORCYCLE LIFT ACCESSORY

RELATED APPLICATIONS

None.

FIELD OF THE INVENTION

The present invention relates generally to a lift accessory and more specifically to a motorcycle lift accessory.

BACKGROUND OF THE INVENTION

Countless Americans enjoy riding motorcycles. The feeling of freedom and pure exhilaration while cruising the countryside with the wind in your hair is a leisure time activity for many. Many others do it out of necessity in the time of rising gas prices. However, whatever the reason for riding a motorcycle, there are the unfortunate times that a motorcycle is dropped on its side. The rider may be getting on or off the motorcycle, the kickstand may fail, or the ground surface upon which the kickstand is resting is not stable.

Whatever, the reason, the motorcycle must be stood back up. Those who may be small of stature, elderly, or those with larger motorcycles may find this impossible to do on their own. Other than calling for help, there is little they can do. Accordingly, there exists a need for a means by which increased leverage may be obtained when up righting a dropped motorcycle in an effort to address the problems as described above. The development of the motorcycle lift accessory fulfills this need.

SUMMARY OF THE INVENTION

To achieve the above and other objectives, the present invention provides for a motorcycle lift accessor having a crash bar gripper having a first side wall, a second side wall, and a third side wall that define a U-shaped channel and a lifting handle coupled to the first side wall of the crash bar gripper, the lifting handle extends perpendicularly from the first side wall that is adapted to be grasped by a motorcyclist.

The crash bar gripper may be adapted to a rear crash bar of a motorcycle such that the rear crash bar is positioned between the first side wall and the second side wall. The crash bar gripper may be coupled to the rear crash bar of the motorcycle by placing an open side of the crash bar gripper adjacent to the rear crash bar and pushing the crash bar gripper in a first direction onto the rear crash bar. The crash bar gripper may be decoupled from the rear crash bar of the motorcycle by sliding the crash bar gripper in a second direction that is opposite the first direction. The crash bar gripper may be adapted to the rear crash bar on the side of the motorcycle that is closest to a ground surface.

A separation distance may exist between the first side wall and the third side wall is at least the diameter of the rear crash bar plus a separation gap that allows movement of the crash bar gripper onto and off of the rear crash bar. The depth of the crash bar gripper from the open side to the second side wall may be equal to the separation distance between the first side wall and the third side wall.

The crash bar gripper may include a rubberized finish to prevent the crash bar gripper from marring the rear crash bar. The crash bar gripper may couple to the rear crash bar that is 1 inch in diameter. The crash bar gripper may couple to the rear crash bar that is 1¼ inch in diameter. The rubberized cover may include a plurality of textured relief to enhance friction. The textured relief may include a pattern of grooved cross-hatching that is cut, stamped, or otherwise placed on the rubberized cover. The lifting handle may include a plurality of slip guards. The slip guards may be a plurality of disks located at the ends of the lifting handle. The slip guards may be adapted to prevent a motorcyclist's hand from sliding off of the lifting handle in a longitudinal direction.

The lifting handle may include a rubberized cover that is adapted to enhance friction between the lifting handle and the motorcyclist's hand.

The slip guards may be located between the lifting handle and the first side wall. The slip guards may be located on the end of the lifting handle that is opposite the crash bar gripper.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
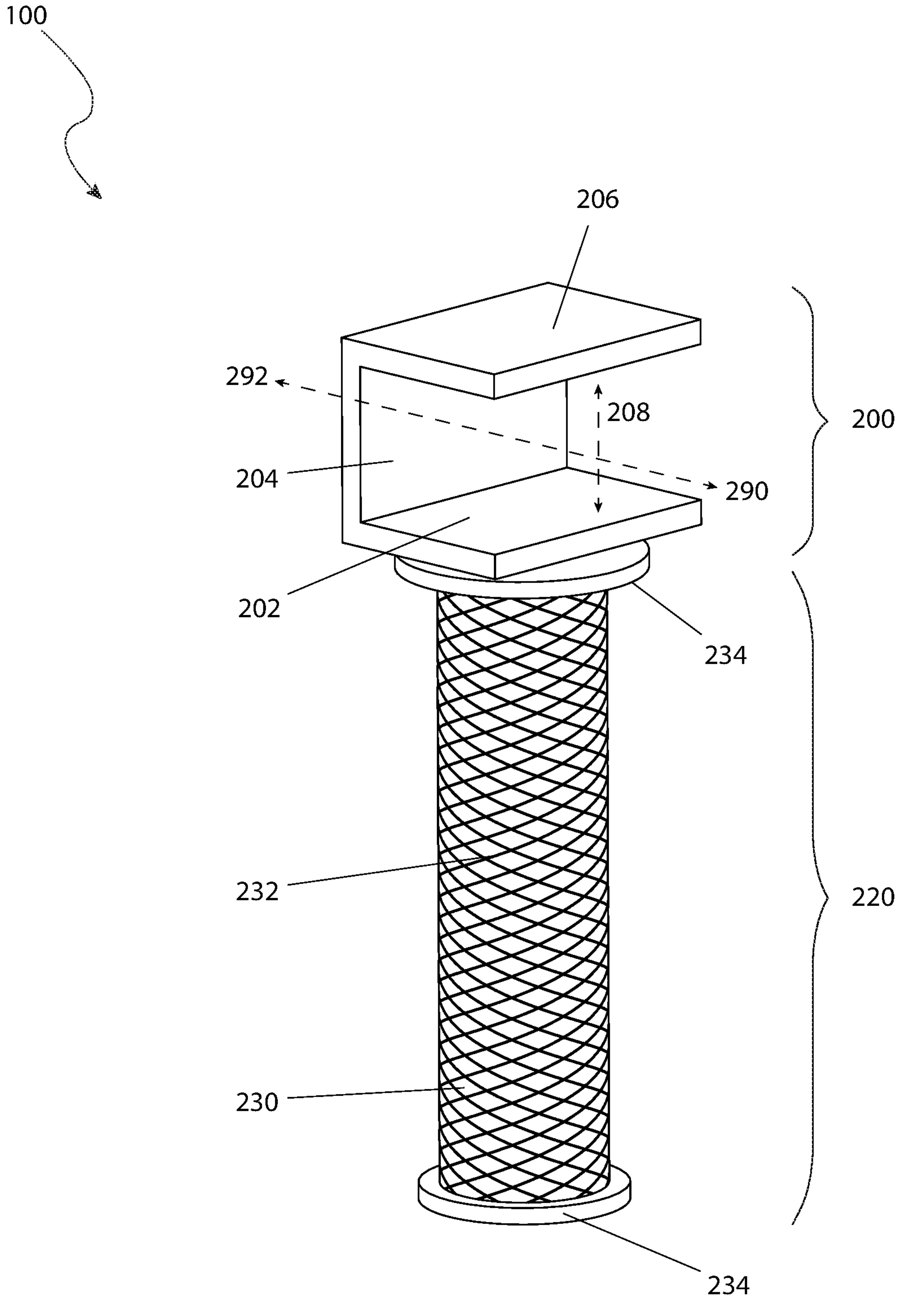
FIG. 1 is an isometric view of a motorcycle lift accessory, according to an embodiment of the present invention.
Figure 2:
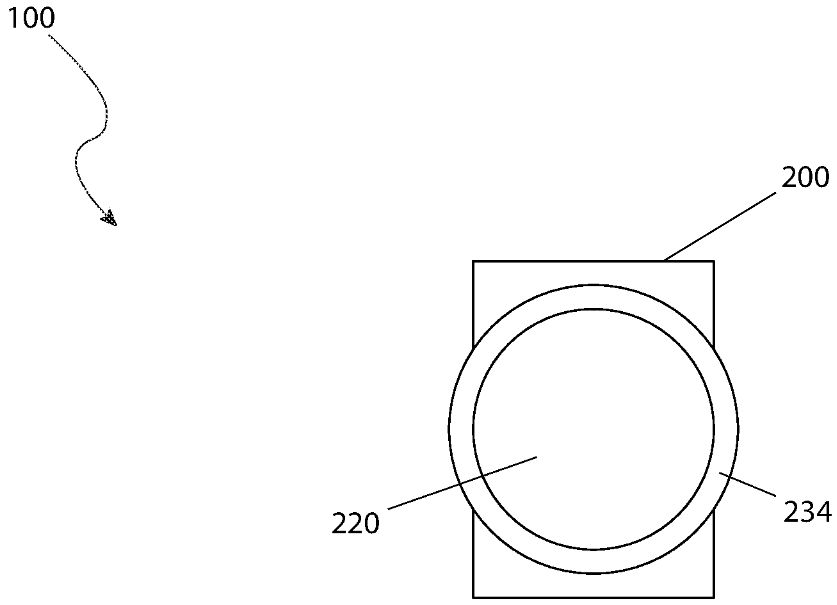
FIG. 2 is a bottom view of a motorcycle lift accessory, according to an embodiment of the present invention.
Figure 3:
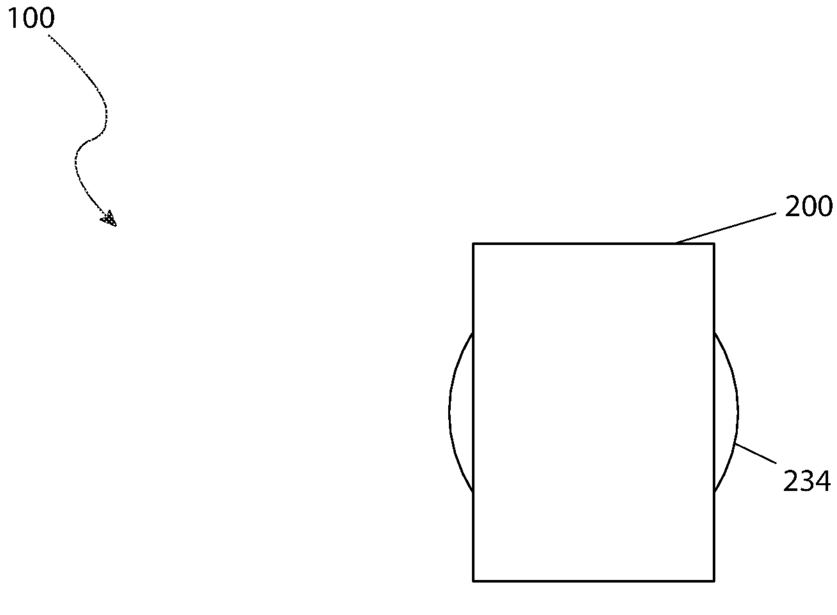
FIG. 3 is a top view of a motorcycle lift accessory, according to an embodiment of the present invention.
Figure 4:
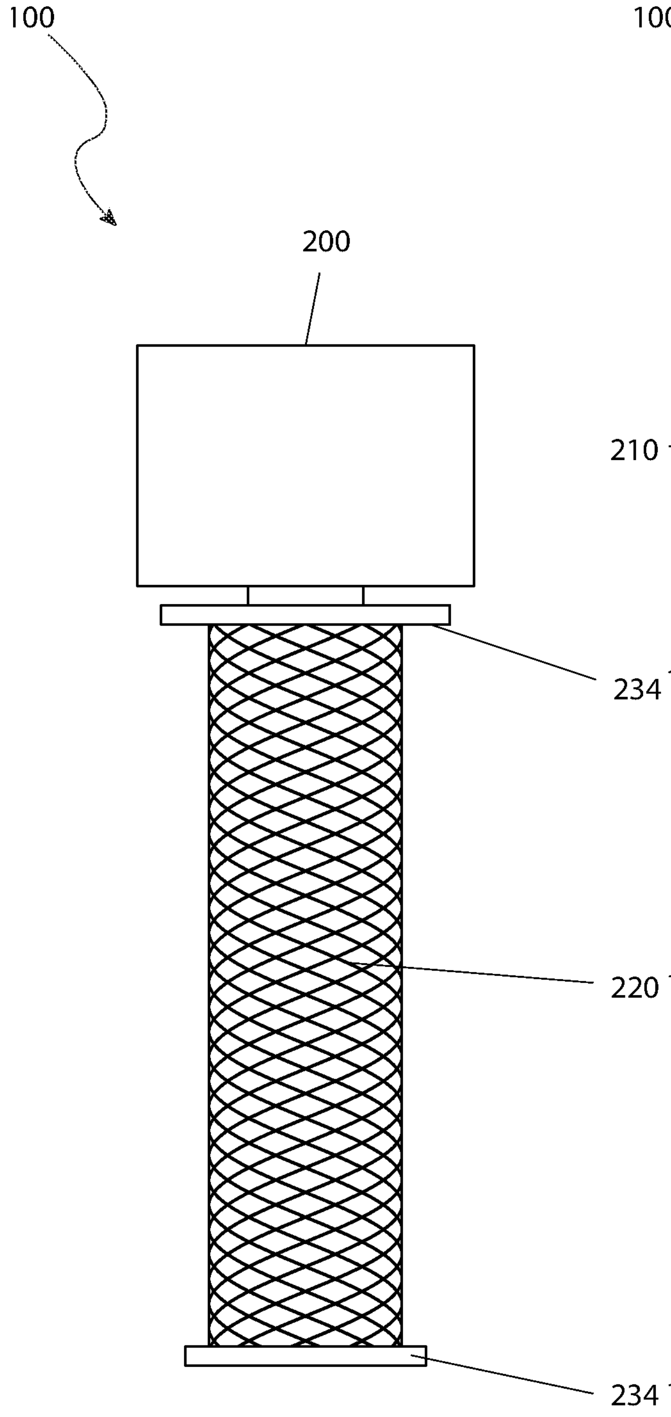
FIG. 4 is a rear view of a motorcycle lift accessory, according to an embodiment of the present invention.
Figure 5:
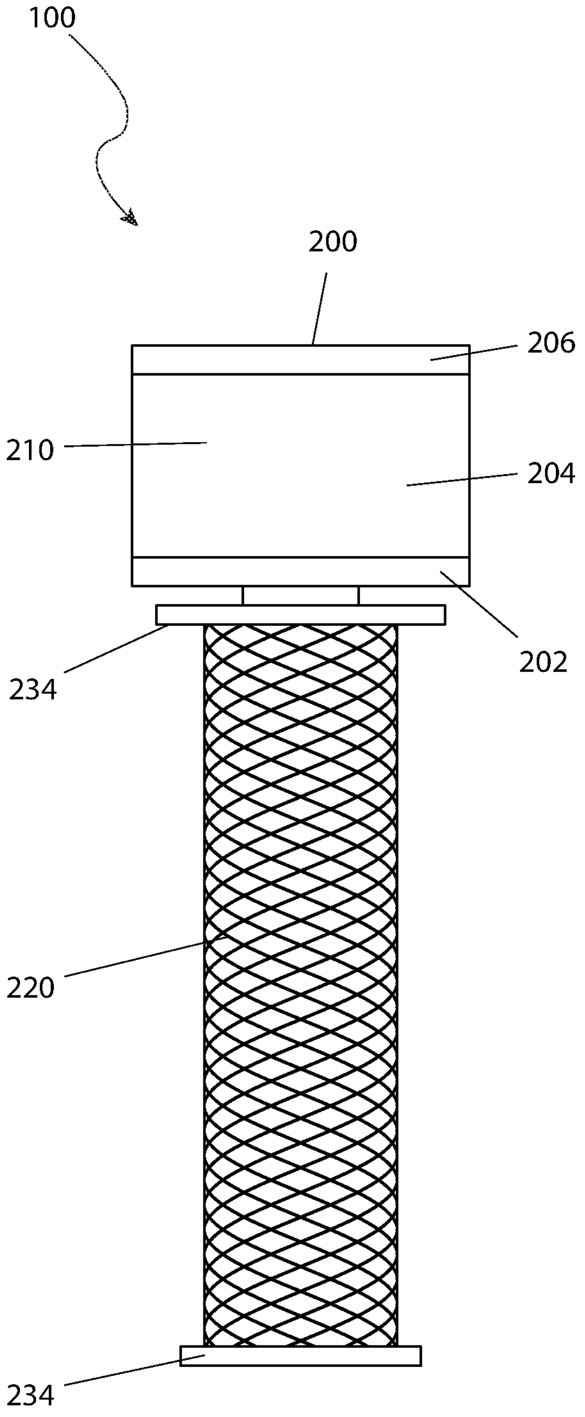
FIG. 5 is a front view of a motorcycle lift accessory, according to an embodiment of the present invention.
Figure 6:
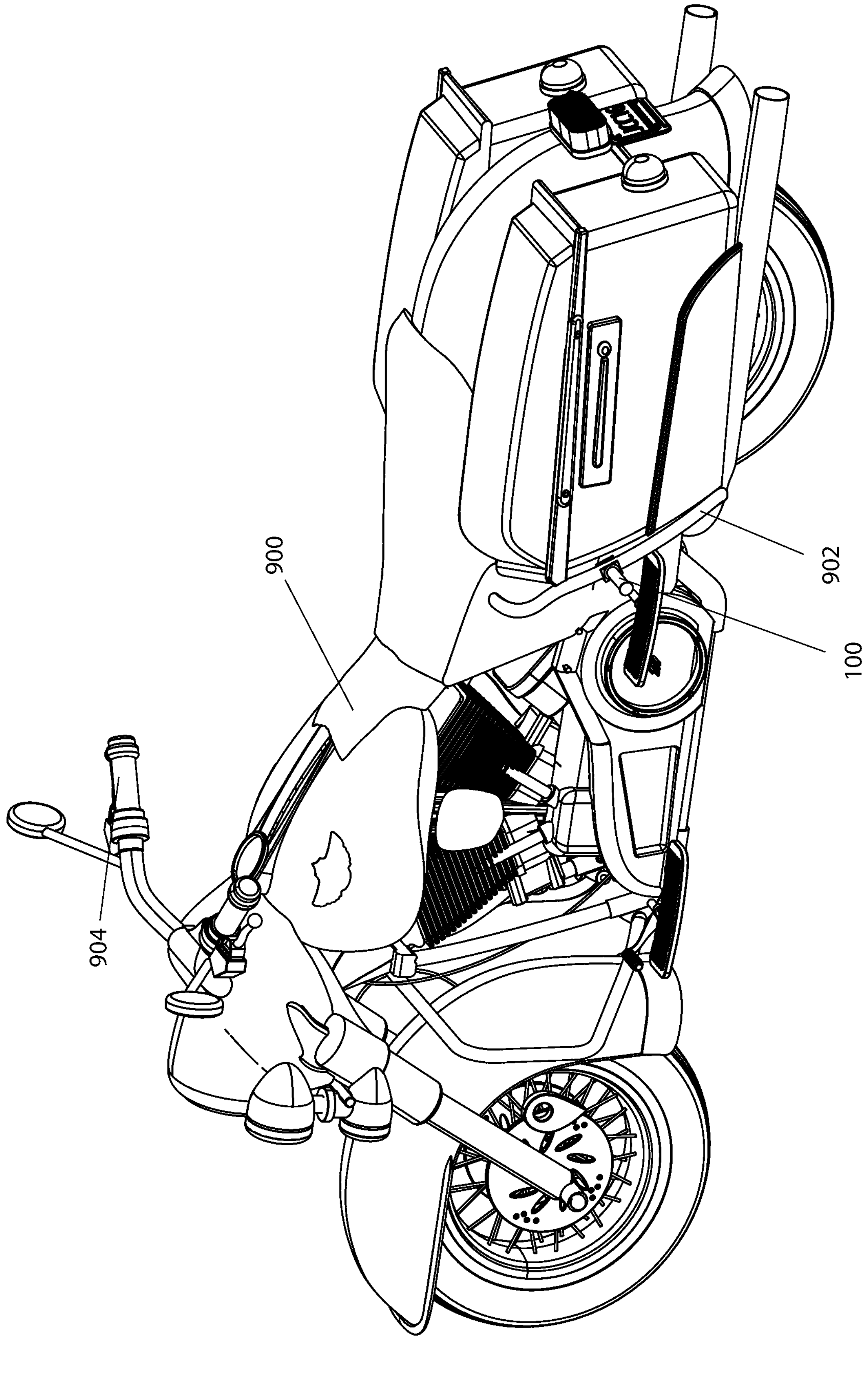
FIG. 6 is an in-use view of a motorcycle lift accessory, according to an embodiment of the present invention.

100 motorcycle lift accessory
200 crash bar gripper
202 first side wall
204 second side wall
206 third side wall
208 open side
210 rubberized finish
220 lifting handle
230 rubberized cover
232 textured relief
234 slip guard
290 first direction
292 second direction
900 motorcycle
902 rear crash bar
904 handlebar

DESCRIPTION OF THE INVENTION

The present invention is directed to a motorcycle lift accessory (herein described as the "invention") 100. The invention 100 may comprise a crash bar gripper 200 and a lifting handle 220. The invention 100 may be an accessory for a motorcycle 900. The invention 100 may detachably couple to a rear crash bar 902 of the motorcycle 900 that has been dropped. The invention 100 may be adapted to be grasped by a motorcyclist while lifting the motorcycle 900. As a non-limiting example, the motorcyclist may couple the crash bar gripper 200 to the rear crash bar 902 under the motorcycle 900, may crouch next to the motorcycle 900 while facing away from the motorcycle 900, may grasp the lower end of the handlebar 904 with a first hand and the lifting handle 220 with a second hand, and may lift the motorcycle 900 by standing. The invention 100 may be removed from the rear crash bar 902 of the upright motorcycle.

The crash bar gripper 200 may comprise a first side wall 202, a second side wall 204, and a third side wall 206 that define a U-shaped channel. The crash bar gripper 200 may be coupled to the rear crash bar 902 such that the rear crash bar 902 is positioned between the first side wall 202 and the second side wall 204 and adjacent to the second side wall 204.

The crash bar gripper 200 may be coupled to the rear crash bar 902 by placing an open side 208 of the crash bar gripper 200 adjacent to the rear crash bar 902 and pushing the crash bar gripper 200 in a first direction 290 onto the rear crash bar 902. The crash bar gripper 200 may be decoupled from the rear crash bar 902 by sliding the crash bar gripper 200 in a second direction 292 that is opposite the first direction 290.

In some embodiments, the crash bar gripper 200 may comprise a rubberized finish 210 to prevent the crash bar gripper 200 from marring the rear crash bar 902.

The dimensions of the crash bar gripper 200 may be chosen to match the diameter of the rear crash bar 902. Specifically, the separation distance between the first side wall 202 and the third side wall 206 may be at least the diameter of the rear crash bar 902 plus a separation gap that allows movement of the crash bar gripper 200 onto and off of the rear crash bar 902. In a preferred embodiment, the crash bar gripper 200 may be dimensioned to couple to one inch (1 in.) diameter crash bars. In an alternative embodiment, the crash bar gripper 200 may be dimensioned to couple to one and one-quarter inch (1¼ in.) diameter crash bars. In some embodiments, the depth of the crash bar gripper 200 as measured from the open side 208 to the second side wall 204 may be the same as the separation distance between the first side wall 202 and the third side wall 206.

The lifting handle 220 may be coupled to the first side wall 202 and may extend perpendicularly from the first side wall 202. The lifting handle 220 may be adapted to be grasped by the motorcyclist.

The lifting handle 220 may comprise a rubberized cover 230 that may be adapted to enhance friction between the lifting handle 220 and the motorcyclist's hand. The rubberized cover 230 may further comprise textured relief 232 to enhance friction. As non-limiting examples, the textured relief 232 may comprise a pattern of groove of cross-hatching that may be cut, stamped, or otherwise placed on the surface of the rubberized cover 230.

The lifting handle 220 may comprise one (1) or more slip guards 234. The slip guards 234 may be one (1) or more disks located at the ends of the lifting handle 220. The slip guards 234 may be adapted to prevent the motorcyclist's hand from sliding off of the lifting handle 220 in a longitudinal direction. As a non-limiting example, one (1) of the slip guards 234 may be located between the lifting handle 220 and the first side wall 202. As a non-limiting example, one (1) of the slip guards 234 may be located on the end of the lifting handle 220 that is opposite the crash bar gripper 200.

In use, the motorcycle 900 may be placed into gear, preferably first gear, with the engine off to prevent the motorcycle 900 from rolling while attempting to lift the motorcycle 900. The crash bar gripper 200 may be coupled to the rear crash bar 902 on the side of the motorcycle 900 that is closest to the ground. The motorcyclist may stand next to the seat facing away from the motorcycle 900. The motorcycle 900 may crouch next to the motorcycle 900 by bending the legs. The motorcyclist may grasp the lower end of the handlebar 904 with the first hand and the lifting handle 220 of the invention 100 with the second hand and may lift the motorcycle 900 by standing. To prevent injury, it is important to keep the back straight and to lift the motorcycle 900 using the legs.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A motorcycle lift accessory, comprising:

a crash bar gripper having a first side wall, a second side wall, and a third side wall that define a U-shaped channel; and a lifting handle coupled to the first side wall of the crash bar gripper, the lifting handle extends perpendicularly from the first side wall that is adapted to be grasped by a motorcyclist; and, wherein the crash bar gripper is adapted to a rear crash bar of a motorcycle such that the rear crash bar is positioned between the first side wall and the second side wall; and, wherein the crash bar gripper is coupled to the rear crash bar of the motorcycle by placing an open side of the crash bar gripper adjacent to the rear crash bar and pushing the crash bar gripper in a first direction onto the rear crash bar.

2. The motorcycle lift accessory, according to claim 1, wherein the crash bar gripper is decoupled from the rear crash bar of the motorcycle by sliding the crash bar gripper in a second direction that is opposite the first direction.

3. The motorcycle lift accessory, according to claim 1, wherein the crash bar gripper is adapted to the rear crash bar on the side of the motorcycle that is closest to a ground surface.

4. The motorcycle lift accessory, according to claim 1, wherein the crash bar gripper includes a rubberized finish to prevent the crash bar gripper from marring the rear crash bar.

5. The motorcycle lift accessory, according to claim 1, wherein the crash bar gripper couples to the rear crash bar that is 1 inch in diameter.

6. The motorcycle lift accessory, according to claim 1, wherein the crash bar gripper couples to the rear crash bar that is 1¼ inch in diameter.

7. The motorcycle lift accessory, according to claim 6, wherein the rubberized cover includes a plurality of textured relief to enhance friction.

8. The motorcycle lift accessory, according to claim 7, wherein the textured relief includes a pattern of grooved cross-hatching that is cut, stamped, or placed on the rubberized cover.

9. The motorcycle lift accessory, according to claim 1, wherein the lifting handle includes a plurality of slip guards.

10. The motorcycle lift accessory, according to claim 9, wherein the slip guards are a plurality of disks located at the ends of the lifting handle.

11. The motorcycle lift accessory, according to claim 10, wherein the slip guards are adapted to prevent a motorcyclist's hand from sliding off of the lifting handle in a longitudinal direction.

12. The motorcycle lift accessory, according to claim 11, wherein the lifting handle includes a rubberized cover that is adapted to enhance friction between the lifting handle and the motorcyclist's hand.

13. The motorcycle lift accessory, according to claim 9, wherein the slip guards are located between the lifting handle and the first side wall.

14. The motorcycle lift accessory, according to claim 9, wherein the slip guards are located on the end of the lifting handle that is opposite the crash bar gripper.

* * * * *